(12) United States Patent
Offen et al.

(10) Patent No.: US 9,898,298 B2
(45) Date of Patent: Feb. 20, 2018

(54) CONTEXT SAVE AND RESTORE

(71) Applicant: Intel Corporation, Santa Clara, CA (US)

(72) Inventors: Zeev Offen, Folsom, CA (US); Inder M. Sodhi, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 522 days.

(21) Appl. No.: 14/139,798

(22) Filed: Dec. 23, 2013

(65) Prior Publication Data
US 2015/0178091 A1 Jun. 25, 2015

(51) Int. Cl.
G06F 7/38 (2006.01)
G06F 9/00 (2006.01)
G06F 9/44 (2006.01)
G06F 9/38 (2018.01)
G06F 1/32 (2006.01)

(52) U.S. Cl.
CPC .......... G06F 9/3861 (2013.01); G06F 1/3287 (2013.01); *Y02B 60/1282* (2013.01)

(58) Field of Classification Search
CPC .............................. G06F 1/3287; G06F 9/3861
USPC ......................................................... 712/228
See application file for complete search history.

(56) References Cited

U.S. PATENT DOCUMENTS

| 6,647,472 B2 * | 11/2003 | Atkinson ................. G06F 12/08 711/158 |
| 7,248,522 B2 * | 7/2007 | Hardee .................. G11C 7/065 365/189.05 |
| 2003/0088761 A1 * | 5/2003 | Paver .................. G06F 9/30105 712/228 |
| 2013/0173902 A1 | 7/2013 | Sodhi et al. |

* cited by examiner

*Primary Examiner* — Chun-Kuan Lee
(74) *Attorney, Agent, or Firm* — Nicholson De Vos Webster & Elliott LLP

(57) ABSTRACT

Processor context save latency is reduced by only restoring context registers with saved state that differs from the reset value of registers. A system agent monitors access to the design blocks and sets a dirty bit to indicate which design block has registers that have changed since the last context save. During a context save operation, the system agent bypasses design blocks that have not had context changes since the latest context save operation. During a context restore operation the system agent does not restore the context registers with saved context values that are equal to the reset value of the context register.

13 Claims, 12 Drawing Sheets

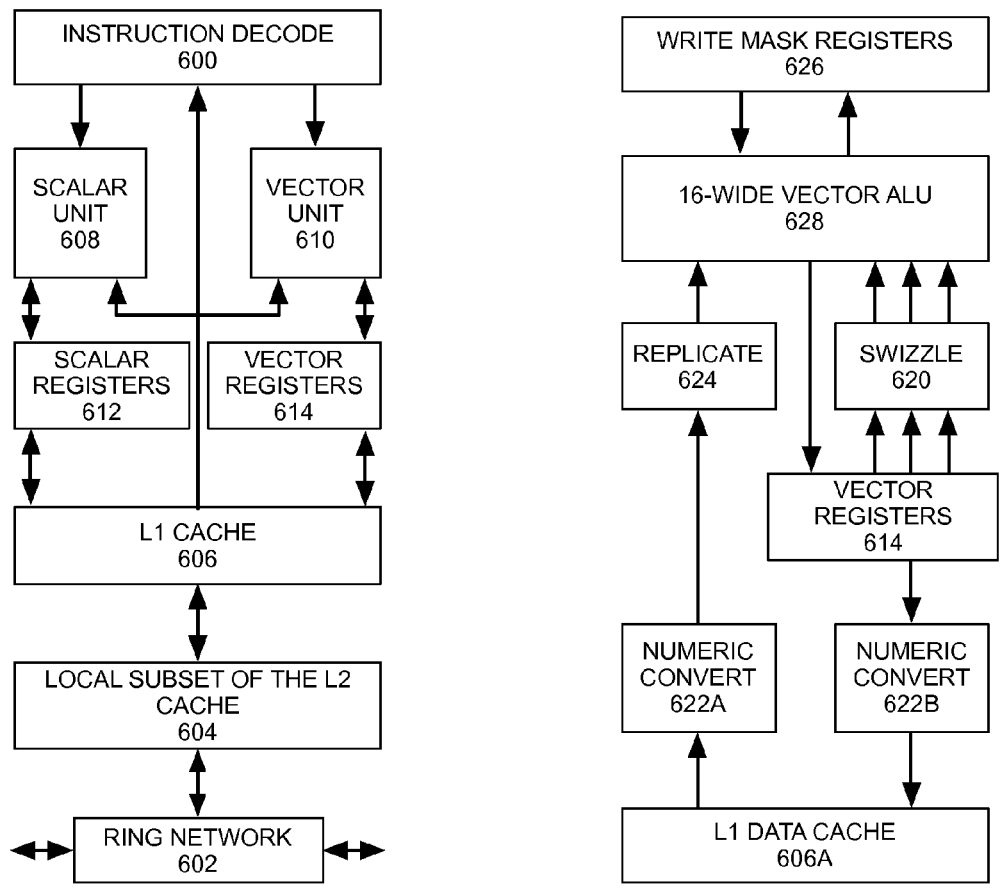

US 9,898,298 B2

CONTEXT SAVE AND RESTORE

FIELD

Embodiments are generally related to context save and restore, and more particularly to reducing the latency of context save and restore.

COPYRIGHT NOTICE/PERMISSION

Portions of the disclosure of this patent document contains material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright© 2013, Intel Corporation, All Rights Reserved.

BACKGROUND

Processors are commonly complex systems that include processing logic as well as circuits intended to interface with one or more devices or other integrated circuits that are external to the processor. Modern processors include multiple design blocks, (e.g., reusable IP design blocks), that perform various functions within the processor, such as digital signal processors, sensor controllers, graphics processors, media processors, audio processors, etc. Each design block maintains context information that is used during the operation of the component, or by software instructions that are executed by the component. The context is collection of registers that store state information that is used during the operation of the design block. Saving and restoring context data allows a computing component's task to be interrupted during operation and resumed at a later point.

However, to allow the processor to resume operation after a deep sleep state in which context information is lost, the context data is first saved to memory that remains powered during the low power state. The repeated saving and restoring context data introduces additional latency system operations as the system transitions through various operational or sleep states. In many designs, the context is saved/restored up to thousands times a second. Some systems use retention capable storage elements that maintain the active context during sleep states, however, such storage elements may be unavailable in certain technologies, or prohibitively expensive in terms of area and power consumption.

BRIEF DESCRIPTION OF THE DRAWINGS

The following description includes discussion of figures having illustrations given by way of example of implementations of the various embodiments. The drawings should be understood by way of example, and not by way of limitation. As used herein, references to one or more "embodiments" are to be understood as describing a particular feature, structure, or characteristic included in at least one implementation. Thus, phrases such as "in one embodiment" or "in an alternate embodiment" appearing herein, each describe various embodiments and implementation, and do not necessarily all refer to the same embodiment. However, they are also not necessarily mutually exclusive.

FIGS. 6A-B illustrate a block diagram of a more specific exemplary in-order core architecture, which would be embodied in one of several logic blocks (including other cores of the same type or different types) in a chip.

An overview of embodiments is provided below, followed by a more detailed description with reference to the figures.

DETAILED DESCRIPTION

As described herein, a system agent within a processor monitors processor design block context changes to avoid redundant context save and restore operations. In most processor designs, the context of the various design blocks are saved and restored frequently. Many design blocks do not experience significant changes to context state between context save and restore. Additionally, context save and restore latency can be particularly high for design blocks that lose context information during deep sleep states.

In one embodiment, context save latency is reduced by restoring only those context registers with saved state that differs from the reset value of registers. A system agent monitors access to the design blocks and sets a dirty bit to indicate which design block has registers that have changed since the last context save. During a context save operation, the system agent bypasses design blocks that have not had context changes since the latest context save operation, and only saves context registers for design blocks that have changed context. In one embodiment, the system agent marks a bit-field for each context register that is changed to a value that differs from the reset value of the register. In one embodiment, during a context restore operation, the system agent does not restore the context registers with saved context values that are equal to the reset value of the context register, while restoring only the context registers with saved values that differ from the reset value of the register.

Figure 1:
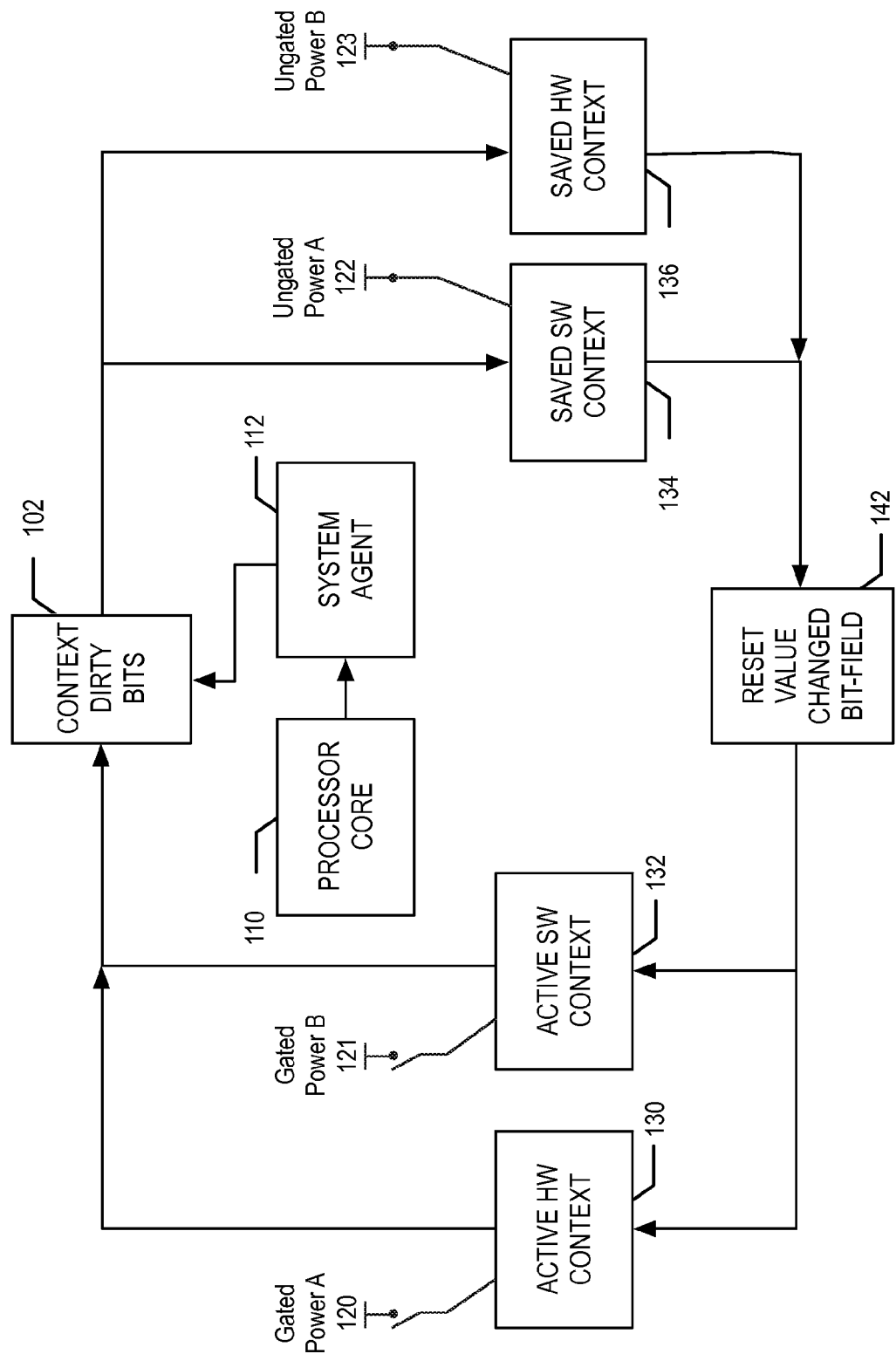
FIG. 1 is a block diagram of an embodiment of a processor for a data processing system with a managed context save and restore.

FIG. 1 is a block diagram of an embodiment of a processor for a data processing system with a managed context save and restore. The processor includes one or more processor cores (e.g., processor core 110) coupled to a system agent 112 via a high-speed bus. The processor also includes multiple reusable design blocks, including modular semiconductor IP design blocks to perform certain functions within the processor. In one embodiment, the system agent 112 manages a set of context dirty bits 102 to track whether a design block's context has been updated since the last context save. Using the context dirty bits, the system agent 112 determines the set of active context registers (e.g., active hardware context 130, active software context 132) to save during the next context save event. While context for a single design block is shown, embodiments are not so limited, and context information for any number of blocks can be managed using embodiments described herein.

For each design block an active hardware (HW) context 130 contains architectural state used by the design block during operation, such as special purpose registers or other hardware state. Software executing on the processor core 110, as well as hardware within the design block changes the active HW context information. In one embodiment, an active software (SW) context 132 for the design block that is used only by software instructions also exists within the design block. The active SW context 132 includes design block context written by software executing on the processor core 110. In one embodiment, the context dirty bits 102 are limited to tracking only the active SW context 132, and the active HW context is always saved.

The processor includes gated and ungated logic, where gated logic is coupled to a switchable power source (e.g., gated power A 120, gated power B 121) that can be selectively disabled while the ungated logic remains powered via an ungated power source (e.g., ungated power A 122, ungated power B 123). Across a progressively deeper processor idle or sleep states an increasing number of components and design blocks enter low power states in which an increasing number of components are powered down. In shallow sleep states sufficient power is supplied to processor components to maintain context, while in deep sleep states power is removed from one or more components, causing the component to lose context and configuration data. In one embodiment, gated power A 120 coupled to the active HW context 130 is independently switchable relative to gated power B 121, which is coupled to the active SW context 132, which enables one portion of the context to be selectively powered sequenced. In one embodiment, the active HW context 130 and active SW context 132 are coupled to the same power domain and switched as a group for each processor component or design block.

Before entering a deep sleep power state, data within the active context registers is saved to save context memory (e.g., 134, 136) within the processor. In one embodiment, data within the registers of the active HW context 130 for a design block is saved within the HW saved context 136 for the design block. Likewise, data within the registers of the active SW context 132 is saved within the SW saved context 134 for the design block. Unlike the active context registers, the saved context registers are coupled to ungated power A 122 and ungated power B 123 that are maintained during a deep sleep power state.

In one embodiment, the processor core 110 accesses the various design blocks using the system agent 112. As the processor core 110 executes software, any activity that changes the SW or HW context of a design block is visible to the system agent 112. When a context register for the design has changed, the system agent 112 sets a dirty bit in a set of context dirty bits 102 that correspond to the design block. The system agent also sets an indicator bit-field (e.g., reset value changed bit-field 142) that corresponds to each changed group of context registers for the design block, to indicate the particular set of context data that has changed for design block.

Based on the context dirty bits 102, design blocks having context that has changed since the last save will not be saved, to reduce the amount of time required to save the context for the processor during a sleep event. For design blocks having changed context, the system agent 112 saves the active design block context data. Active HW context 130 for the design block is stored in a set of HW saved context memory 136, while the active SW context 132 is stored within a set of SW saved context memory 134. For each portion of context in the active HW context 130 and the active SW context 132, a bit in the reset_value_changed bit-field 142 is set, to indicate which portion of the context for the design block has changed. Once each component of the processor that will lose context information has its context saved, the processor enters a sleep state and the power management logic in the system agent 112 removes power to certain components.

To enter low-power sleep state, the power management logic reduces voltage to the gated power source coupled to the gated logic components. The voltage to the ungated power source is not substantially reduced when the processor is the reduced power state, to maintain power to critical components, such as the context save memory, that are responsible to saving processor configuration information, and other information used to restore the processor to an operational state. When the processor is to return to an operational state, the power management logic in the system agent 112 restores the gated power to an operational level. When the processor is restored from the sleep state, the context for the various components is restored. In one embodiment, the system agent 112 uses the reset_value_changed bit-field 142 to restore only those portions of context in the active HW context 130 and active SW context 132 that have changed from the reset (e.g., power-on) value of the design block. Reducing the number of registers to restore reduces the context restore latency for the processor.

Figure 2:
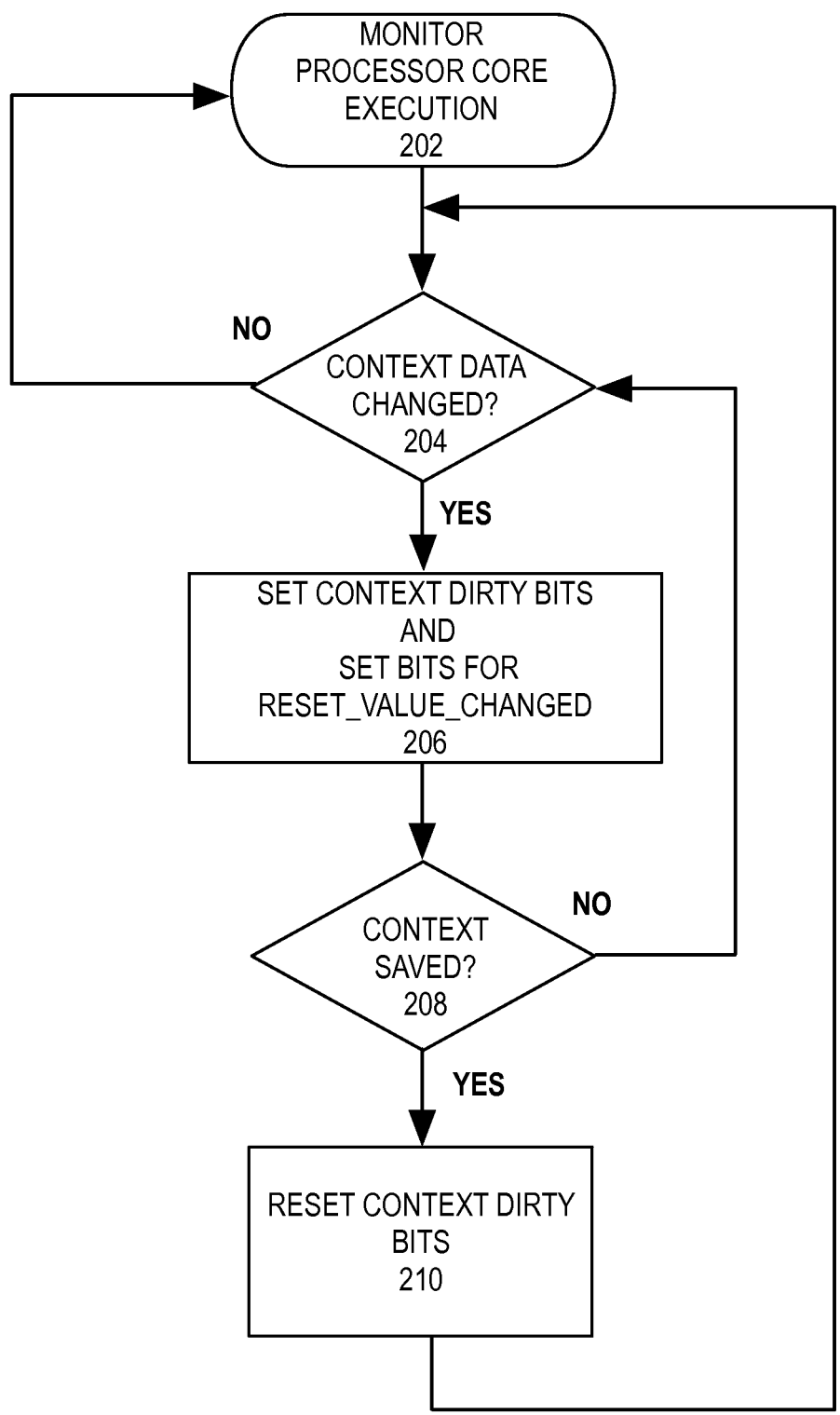
FIG. 2 is a flow diagram of an embodiment of a method of managing context save and restore at a system agent.

FIG. 2 is a flow diagram of an embodiment of a method of managing context save and restore at a system agent. As shown at 202, each processor core (e.g., processor core 110) executing software sends requests via the system agent (e.g., system agent 112) to access the various design blocks within the processor. The system agent monitors access to the design blocks until, as indicated at 204, an access request occurs which would result in a change to the context data of a design block. When a request to change the context of a design block is received at the system agent, the system agent sets a context_dirty bit for design block and sets bits in the reset_context_changed bit-field to indicate which portion or portions of the context of a design block has changed from the default reset value, as shown at 206.

The granularity of the mapping between reset_context_changed bit-field and the various portions of the context can vary. In one embodiment, a bit corresponds to each register in the context of a design block. In one embodiment, a bit corresponds to each set of related registers in the context of the design block. For example, where a change in one register generally correlates with a change in other registers, a single bit can correspond to the group of registers.

As the processor cores execute software, additional context registers are modified, and the system agent continues to set context_dirty and reset_value_changed bits at 206. At 204, if context data has not yet been saved, execution returns to 204 until an additional context save request is received. Once a context save event occurs, the system agent will detect the event at 208 and proceed to 210, where the context_dirty bits are reset. The system agent context logic then returns to 204, where the system agent monitors processor core access requests to the design blocks until a request to change a register of the design block context is received.

Figure 3:
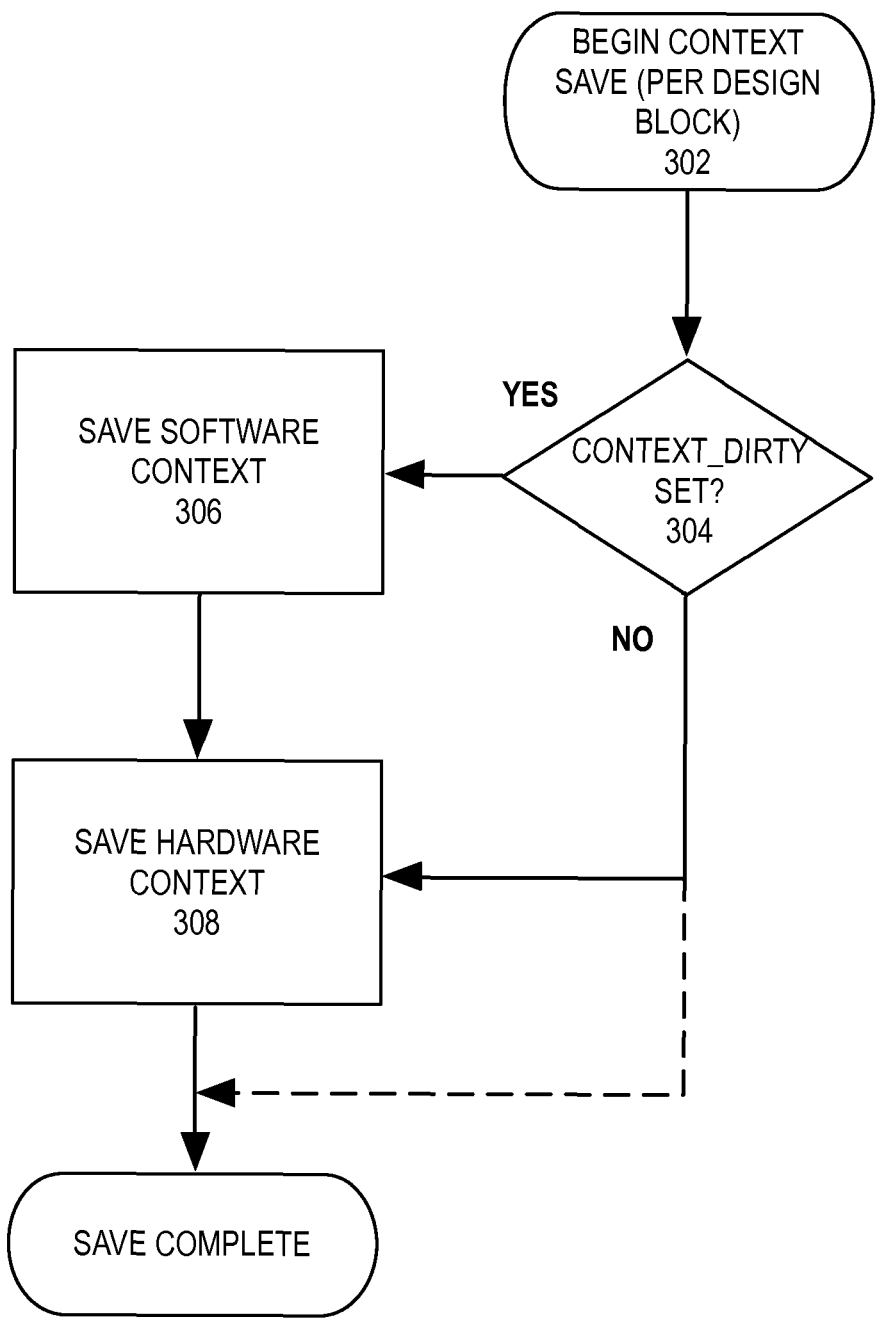
FIG. 3 is a flow diagram of an embodiment of a context save algorithm.

FIG. 3 is a flow diagram of an embodiment of a context save algorithm of the system agent. The system agent begins the context save operation at 302 where, for each design block, the system agent determines whether the context_dirty bit is set, as shown at 304. When the context_dirty bit for the design block is set at 304, the system agent performs an operation at 306 to save the SW context data for the design block. Context data from the active SW context registers is copied to a context save memory to maintain the register data when power to the design block is removed during a deep sleep event. In one embodiment, all SW context information is saved when a design block has dirty context. In one embodiment, multiple dirty bits are used per design block to specify a specific portion of the context.

In one embodiment, the system agent proceeds to 308 after saving the SW context data, as shown at 306. Where HW context for a design block is completely manageable by the system agent, an embodiment maintains context_dirty bits for both SW and HW context, and a HW context save is avoided for a design block if the context_dirty bit is not set at 304. In some design blocks the HW context can change autonomously without the system agent's knowledge, so a clean set of context_dirty bits will not always indicate that the HW context is unchanged. Accordingly, in one embodiment the system agent proceeds to 308 if context_dirty is not set at 304, to save the HW context whether or not the SW context is saved. The system agent then proceeds to save context for each other design block with a context_dirty bit set. Once the context for each design block is saved, the system agent context save operation is complete.

Figure 4:
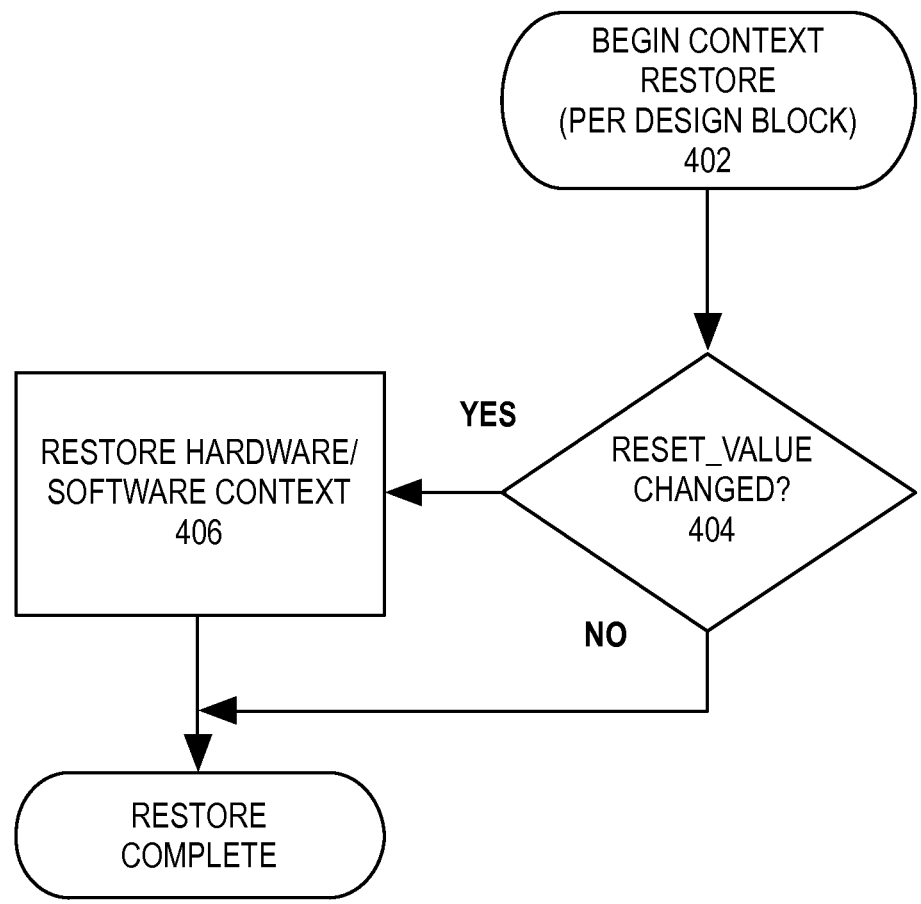
FIG. 4 is a flow diagram of an embodiment of a context restore algorithm.

FIG. 4 is a flow diagram of an embodiment of a context restore algorithm. The system agent begins at 402 for each design block. At 404, the system agent checks the reset_value_changed bit, to determine if the stored context differs from the reset value held by the active context at power on. If the saved context value differs from the reset value, the system agent restores both the SW and HW context for the design block. As with the context_dirty bit, the granularity of the reset_value_changed bit can vary. In one embodiment, a single bit is used for the entire context of the design block. In one embodiment, a first bit corresponds to the SW context, while a second bit corresponds to the HW context. In one embodiment, each register or group of registers has an associated reset_value_changed bit. As shown at 406. Once the changed SW and HW context registers for the design block are restored, the system agent restore operation is complete.

Processors can be implemented in a variety of ways and for different purposes. Implementations of different processors can include: 1) a CPU including one or more general purpose in-order cores intended for general-purpose computing or one or more general purpose out-of-order cores intended for general-purpose computing; and 2) a coprocessor including one or more special purpose cores intended primarily for graphics or scientific (throughput). Such different processors lead to different computer system architectures, which can include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics or scientific (throughput) logic, or as special purpose cores); and 4) a system on a chip that can include on the same die the described CPU (sometimes referred to as the application core(s) or application processor(s)), the above described coprocessor, and additional functionality. The processor special purpose logic can be one of the multiple design blocks described herein.

The processor cores of the processor can be implemented in different ways, for different purposes, and in different processors. For instance, implementations of such cores include: 1) a general purpose in-order core intended for general-purpose computing; 2) a high performance general purpose out-of-order core intended for general-purpose computing; 3) a special purpose core intended primarily for graphics or scientific (throughput) computing. Exemplary core architectures are described next, followed by descriptions of exemplary processors and computer architectures.

Figures 5A, 5B:
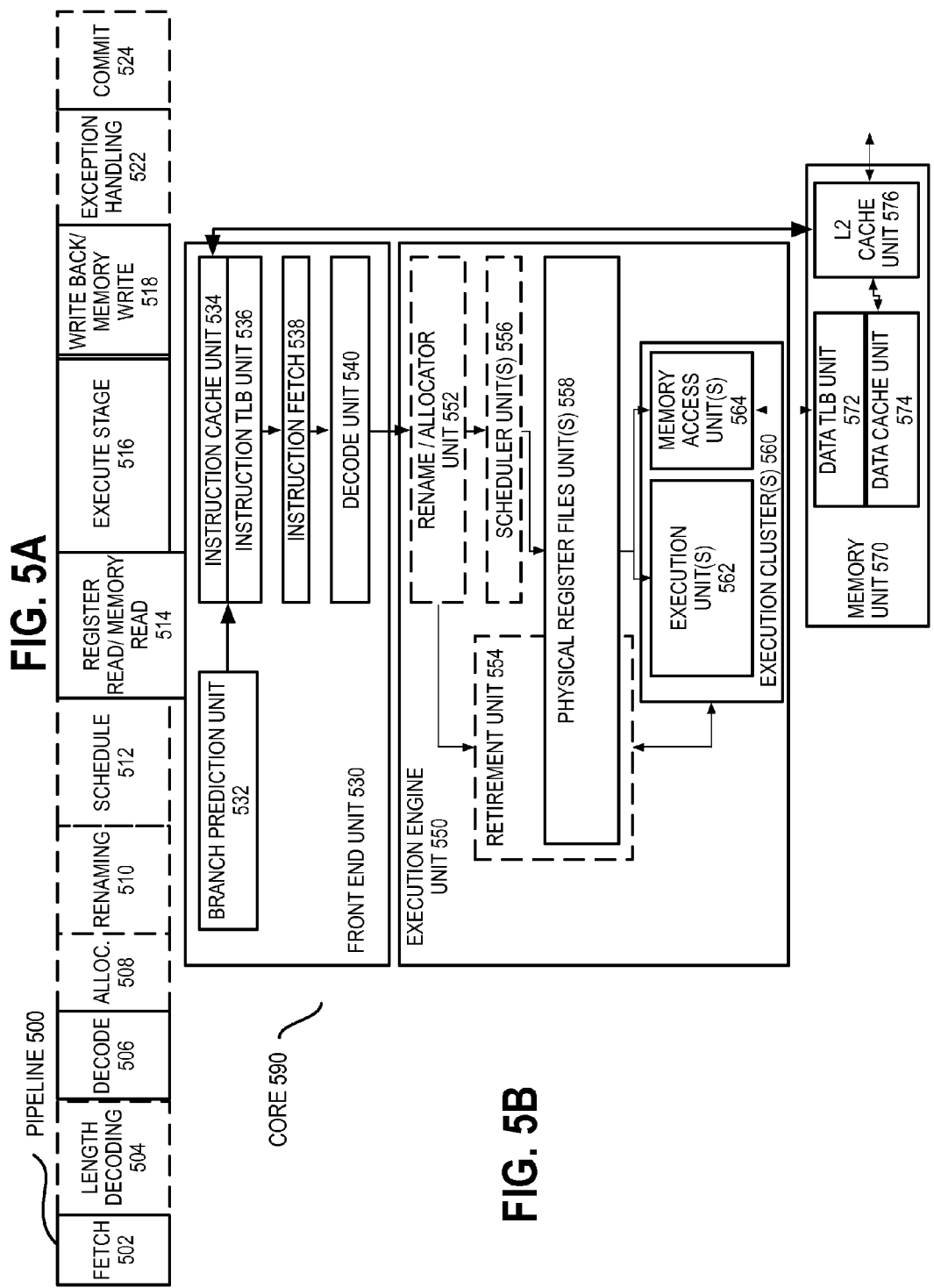
FIG. 5A is a block diagram illustrating an exemplary in-order pipeline and an exemplary register renaming, out-of-order issue/execution pipeline.
FIG. 5B is a block diagram illustrating an in-order architecture core and a register renaming, out-of-order issue/execution architecture core to be included in a processor according to embodiments.

FIG. 5A is a block diagram illustrating exemplary in-order pipeline and an exemplary register renaming, out-of-order issue/execution pipeline. FIG. 5B is a block diagram illustrating an in-order architecture core and a register renaming, out-of-order issue/execution architecture core to be included in a processor according to embodiments. The solid lined boxes in FIGS. 5A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 5A, a processor pipeline 500 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524.

FIG. 5B shows processor core 590 including a front-end unit 530 coupled to an execution engine unit 550, and both are coupled to a memory unit 570. The core 590 can be a reduced instruction set computing (RISC) core, a complex instruction set computing (CISC) core, a very long instruction word (VLIW) core, or a hybrid or alternative core type. As yet another option, the core 590 can be a special-purpose core, such as, for example, a network or communication core, compression engine, coprocessor core, general purpose computing graphics processing unit (GPGPU) core, graphics core, or the like.

The front-end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (or decoder) can decode instructions, and generate as an output one or more micro-operations, micro-code entry points, microinstructions, other instructions, or other control signals, which are decoded from, or which otherwise reflect, or are derived from, the original instructions. The decode unit 540 can be implemented using various different mechanisms. Examples of suitable mechanisms include, but are not limited to, look-up tables, hardware implementations, programmable logic arrays (PLAs), microcode read only memories (ROMs), etc. In one embodiment, the core 590 includes a microcode ROM or other medium that stores microcode for certain macroinstructions (e.g., in decode unit 540 or otherwise within the front-end unit 530). The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations, central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 558 comprises a vector registers unit, a write mask registers unit, and a scalar registers unit. These register units can provide architectural vector registers, vector mask registers, and general-purpose registers. The physical register file(s) unit(s) 558 is overlapped by the retirement unit 554 to illustrate various ways in which register renaming and out-of-order execution can be implemented (e.g., using a reorder buffer(s) and a retirement register file(s); using a future file(s), a history buffer(s), and a retirement register file(s); using a register maps and a pool of registers; etc.).

The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 perform various operations (e.g., shifts, addition, subtraction, multiplication) on various types of data (e.g., scalar floating point, packed integer, packed floating point, vector integer, vector floating point).

While some embodiments include a number of execution units dedicated to specific functions or sets of functions, other embodiments include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, or a memory access pipeline that each have their own scheduler unit, physical register file(s) unit, or execution cluster—and in the case of a separate memory access pipeline, certain embodiments are implemented in which only the execution cluster of this pipeline has the memory access unit(s) 564). It should also be understood that where separate pipelines are used, one or more of these pipelines can be out-of-order issue/execution and the rest in-order.

The set of memory access units 564 is coupled to the memory unit 570, which includes a data TLB unit 572 coupled to a data cache unit 574 coupled to a level 2 (L2) cache unit 576. In one exemplary embodiment, the memory access units 564 include a load unit, a store address unit, and a store data unit, each of which is coupled to the data TLB unit 572 in the memory unit 570. The instruction cache unit 534 is further coupled to a level 2 (L2) cache unit 576 in the memory unit 570. The L2 cache unit 576 is coupled to one or more other levels of cache and eventually to a main memory.

The exemplary register renaming, out-of-order issue/execution core architecture implements the pipeline 500 as follows: 1) the instruction fetch unit 538 performs the fetch and length decoding stages 502 and 504; 2) the decode unit 540 performs the decode stage 506; 3) the rename/allocator unit 552 performs the allocation stage 508 and renaming stage 510; 4) the scheduler unit(s) 556 performs the schedule stage 512; 5) the physical register file(s) unit(s) 558 and the memory unit 570 perform the register read/memory read stage 514; the execution cluster 560 perform the execute stage 516; 6) the memory unit 570 and the physical register file(s) unit(s) 558 perform the write back/memory write stage 518; 7) various units are involved in the exception handling stage 522; and 8) the retirement unit 554 and the physical register file(s) unit(s) 558 perform the commit stage 524.

The core 590 supports one or more instructions sets (e.g., the x86 instruction set (with some extensions that have been added with newer versions); the MIPS instruction set of MIPS Technologies of Sunnyvale, Calif.; the ARM instruction set (with optional additional extensions) of ARM Holdings of San Jose, Calif.), including the instruction(s) described herein. In one embodiment, the core 590 includes logic to support a packed data instruction set extension (e.g., AVX1, AVX2), thereby allowing the operations used by many multimedia applications to be performed using packed data.

It will be understood that the core can support multithreading (executing two or more parallel sets of operations or threads), and can do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading Technology).

While register renaming is described in the context of out-of-order execution, it will be understood that register renaming can be used in an in-order architecture. While the illustrated embodiment of the processor also includes separate instruction and data cache units 534/574 and a shared L2 cache unit 576, alternative embodiments have a single internal cache for both instructions and data, such as, for example, a Level 1 (L1) internal cache, or multiple levels of internal cache. In some embodiments, the system includes a combination of an internal cache and an external cache that is external to the core or the processor. Alternatively, all of the cache can be external to the core or the processor.

FIGS. 6A-B illustrate a block diagram of a more specific exemplary in-order core architecture, which would be embodied in one of several logic blocks (including other cores of the same type or different types) in a chip. The logic blocks communicate through a high-bandwidth interconnect network (e.g., a ring network) with some fixed function logic, memory I/O interfaces, and other necessary I/O logic, depending on the application.

FIG. 6A is a block diagram of a single processor core, along with its connection to the on-die interconnect network 602 and with its local subset of the Level 2 (L2) cache 604, according to embodiments. In one embodiment, an instruction decoder 600 supports the x86 instruction set with a packed data instruction set extension. An L1 cache 606 allows low-latency accesses to cache memory into the scalar and vector units. While in one embodiment (to simplify the design), a scalar unit 608 and a vector unit 610 use separate register sets (respectively, scalar registers 612 and vector registers 614) and data transferred between them is written to memory and then read back in from a level 1 (L1) cache 606, alternative embodiments use a different approach (e.g., use a single register set or include a communication path that allow data to be transferred between the two register files without being written and read back).

The local subset of the L2 cache 604 is part of a global L2 cache that is divided into separate local subsets, one per processor core. Each processor core has a direct access path to its own local subset of the L2 cache 604. Data read by a processor core is stored in its L2 cache subset 604 and can be accessed quickly; in parallel with other processor cores accessing their own local L2 cache subsets. Data written by a processor core is stored in its own L2 cache subset 604 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 6B is an expanded view of part of the processor core in FIG. 6A according to embodiments. FIG. 6B includes an L1 data cache 606A part of the L1 cache 604, as well as more detail regarding the vector unit 610 and the vector registers 614. Specifically, the vector unit 610 is a 16-wide vector processing unit (VPU) (see the 16-wide ALU 628), which executes one or more of integer, single-precision float, and double-precision float instructions. The VPU supports swizzling the register inputs with swizzle unit 620, numeric conversion with numeric convert units 622A-B, and replication with replication unit 624 on the memory input. Write mask registers 626 allow predicating resulting vector writes.

Figure 7:
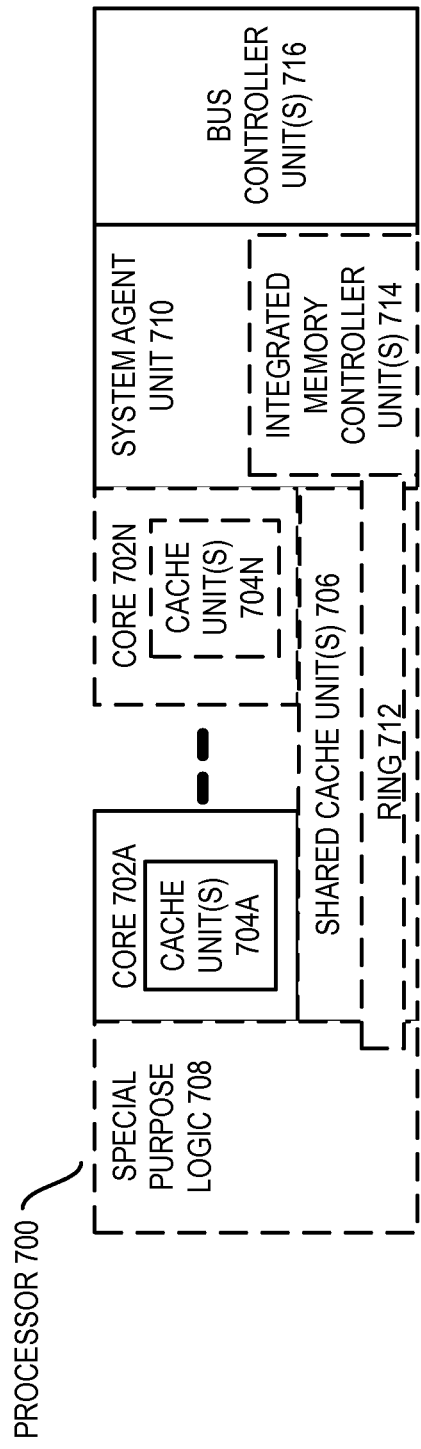
FIG. 7 is a block diagram of an embodiment of a processor that can have more than one core, an integrated memory controller, and integrated graphics.

FIG. 7 is a block diagram of an embodiment of a processor 700 that can have one or more cores, an integrated memory controller, and integrated graphics. The solid lined boxes in FIG. 7 illustrate a processor 700 with a single core 702A, a system agent 710, a set of one or more bus controller units 716, while the optional addition of the dashed lined boxes illustrates an alternative processor 700 with multiple cores 702A-N, a set of one or more integrated memory controller unit(s) 714 in the system agent unit 710, and special purpose logic 708.

Thus, different implementations of the processor 700 include: 1) a CPU with the special purpose logic 708 being integrated graphics or scientific (throughput) logic including multiple cores, and the cores 702A-N being one or more general purpose cores (e.g., general purpose in-order cores, general purpose out-of-order cores, a combination of the two); 2) a coprocessor with the cores 702A-N being a large number of special purpose cores intended primarily for graphics or scientific (throughput); and 3) a coprocessor with the cores 702A-N being a large number of general purpose in-order cores. Thus, the processor 700 can be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor can be implemented on one or more chips. The processor 700 can be a part of or be implemented on one or more substrates using any of a number of process technologies, such as, for example, BiCMOS, CMOS, or NMOS.

The memory hierarchy includes one or more levels of cache within the cores, a set or one or more shared cache units 706, and external memory (not shown) coupled to the set of integrated memory controller units 714. The set of shared cache units 706 can include one or more mid-level caches, such as level 2 (L2), level 3 (L3), level 4 (L4), or other levels of cache, a last level cache (LLC), or combinations thereof. While in one embodiment a ring based interconnect unit 712 interconnects the integrated graphics logic 708, the set of shared cache units 706, and the system agent unit 710/integrated memory controller unit(s) 714, alternative embodiments use any number of well-known techniques for interconnecting such units. In one embodiment, coherency is maintained between one or more cache units 706 and cores 702-A-N.

In some embodiments, one or more of the cores 702A-N are capable of multithreading. The system agent 710 includes those components coordinating and operating cores 702A-N. The system agent unit 710 can include for example a power control unit (PCU) and a display unit. The PCU can be or include logic and components needed for regulating the power state of the cores 702A-N and the integrated graphics logic 708. The display unit is for driving one or more externally connected displays.

The cores 702A-N can be homogenous or heterogeneous in terms of architecture instruction set; that is, two or more of the cores 702A-N are capable of execution the same instruction set, while other cores are capable of executing only a subset of that instruction set or a different instruction set.

FIGS. 8-11 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and other execution logic as disclosed herein are generally suitable.

Figure 8:
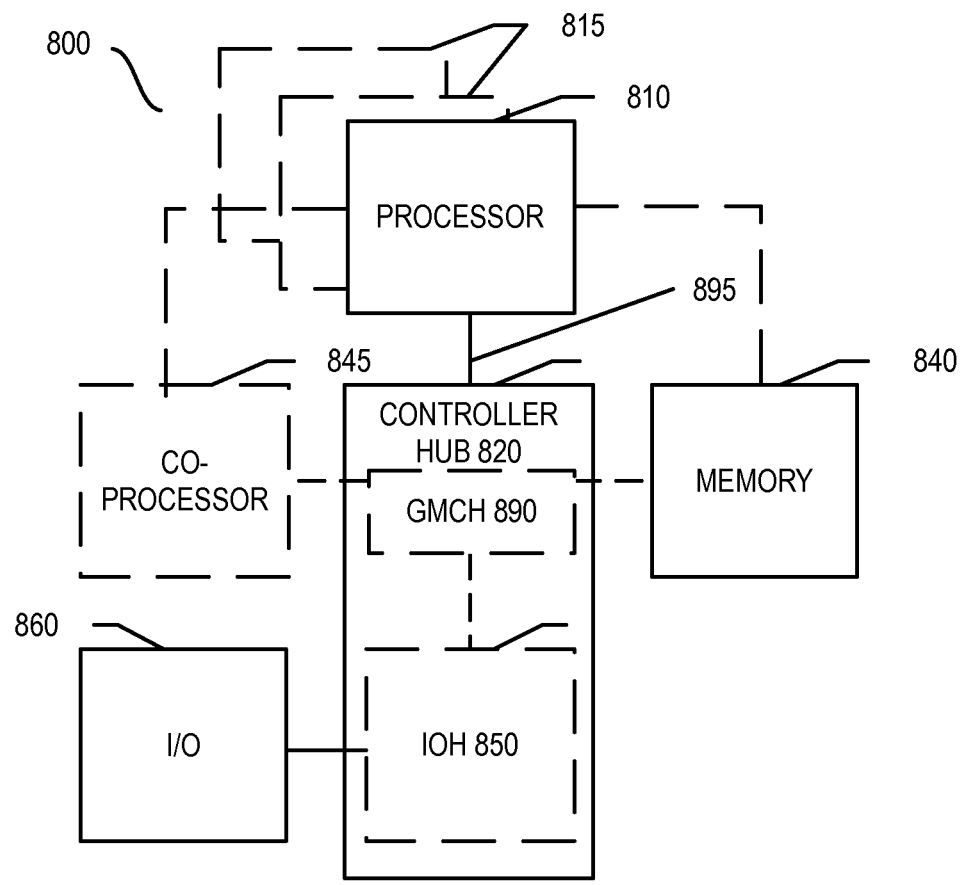
FIGS. 8-11 are block diagrams of exemplary computer architectures.

FIG. 8 is a block diagram of a system 800 in accordance with an embodiment. The system 800 includes one or more processors 810, 815, which are coupled to a controller hub 820. In one embodiment the controller hub 820 includes a graphics memory controller hub (GMCH) 890 and an Input/Output Hub (IOH) 850 (which can be integrated or on separate chips); the GMCH 890 includes memory and graphics controllers to which are coupled memory 840 and a coprocessor 845; the IOH 850 is couples input/output (I/O) devices 860 to the GMCH 890. Alternatively, one or both of the memory and graphics controllers are integrated within the processor (as described herein), the memory 840 and the coprocessor 845 are coupled directly to the processor 810, and the controller hub 820 in a single chip with the IOH 850.

The optional nature of additional processors 815 is denoted in FIG. 8 with broken lines. Each processor 810, 815 includes one or more of the processing cores described herein and can be some version of the processor 700. The memory 840 can be, for example, dynamic random access memory (DRAM), phase change memory (PCM), or a combination of the two. For at least one embodiment, the controller hub 820 communicates with the processor(s) 810, 815 via a multi-drop bus, such as a frontside bus (FSB), point-to-point interface such as QuickPath Interconnect (QPI), or similar connection 895. In one embodiment, the coprocessor 845 is a special-purpose processor, such as, for example, a high-throughput MIC processor, a network or communication processor, compression engine, graphics processor, GPGPU, embedded processor, or the like. In one embodiment, controller hub 820 includes an integrated graphics accelerator. There can be a variety of differences between the physical resources 810, 815 in terms of a spectrum of metrics of merit including architectural, microarchitectural, thermal, power consumption characteristics, and the like.

In one embodiment, the processor 810 executes instructions that control data processing operations of a general type. For example, coprocessor instructions can be embedded within the instructions. The processor 810 recognizes that the attached coprocessor 845 should execute these instructions. Accordingly, the processor 810 issues these coprocessor instructions (or control signals representing coprocessor instructions) on a coprocessor bus or other interconnect, to coprocessor 845. Coprocessor(s) 845 accept and execute the received coprocessor instructions.

Figure 9:
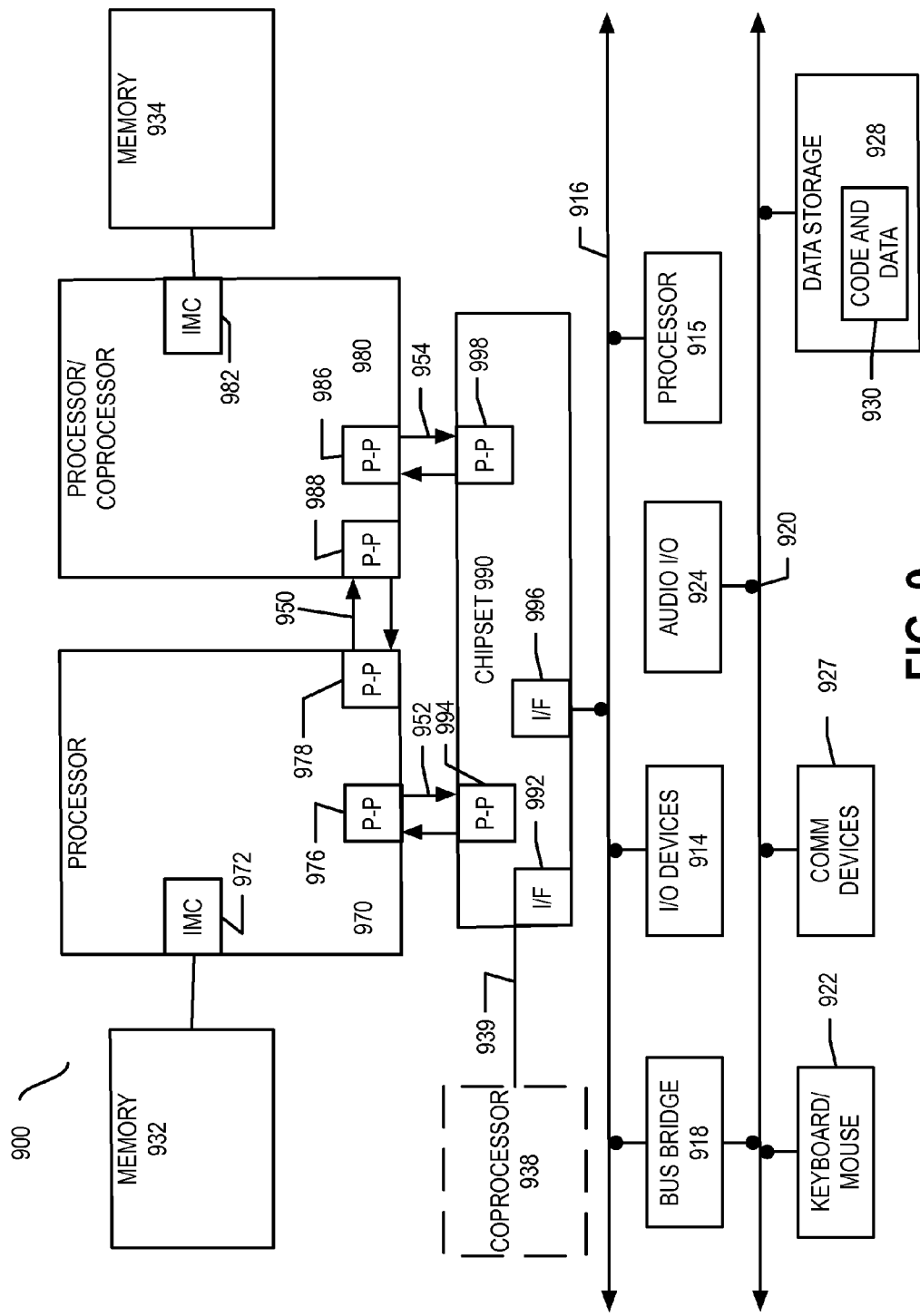

FIG. 9 is a block diagram of a first more specific exemplary system 900. As shown in FIG. 9, multiprocessor system 900 is a point-to-point interconnect system, and includes a first processor 970 and a second processor 980 coupled via a point-to-point interconnect 950. Each of processors 970 and 980 can be some version of the processor 700. In one embodiment, processors 970 and 980 are respectively processors 810 and 815, while coprocessor 938 is coprocessor 845. In another embodiment, processors 970 and 980 are respectively processor 810 coprocessor 845.

Processors 970 and 980 are shown including integrated memory controller (IMC) units 972 and 982, respectively. Processor 970 also includes as part of its bus controller units point-to-point (P-P) interfaces 976 and 978; similarly, second processor 980 includes P-P interfaces 986 and 988. Processors 970, 980 exchange information via a point-to-point (P-P) interface 950 using P-P interface circuits 978, 988. As shown in FIG. 9, IMCs 972 and 982 couple the processors to respective memories, namely a memory 932 and a memory 934, which can be portions of main memory locally attached to the respective processors.

Processors 970, 980 each exchange information with a chipset 990 via individual P-P interfaces 952, 954 using point to point interface circuits 976, 994, 986, 998. Chipset 990 optionally exchanges information with the coprocessor 938 via a high-performance interface 939. In one embodiment, the coprocessor 938 is a special-purpose processor, such as, for example, a high-throughput MIC processor, a network or communication processor, compression engine, graphics processor, GPGPU, embedded processor, or the like.

A shared cache (not shown) can be included in either processor or outside of both processors, yet connected with the processors via P-P interconnect, such that either or both processors' local cache information can be stored in the shared cache if a processor is placed into a low power mode.

Chipset 990 can be coupled to a first bus 916 via an interface 996. In one embodiment, first bus 916 is a Peripheral Component Interconnect (PCI) bus, or a bus such as a PCI Express bus or another third generation I/O interconnect bus, although these are non-limiting examples.

As shown in FIG. 9, various I/O devices 914 can be coupled to first bus 916, along with a bus bridge 918 that couples first bus 916 to a second bus 920. In one embodiment, one or more additional processor(s) 915, such as coprocessors, high-throughput MIC processors, GPGPU's, accelerators (such as, e.g., graphics accelerators or digital signal processing (DSP) units), field programmable gate arrays, or any other processor, are coupled to first bus 916. In one embodiment, second bus 920 is a low pin count (LPC) bus. Various devices can be coupled to a second bus 920 including, for example, a keyboard and mouse 922, communication devices 927 and a storage unit 928 such as a disk drive or other mass storage device, which includes code and data 930, in one embodiment. Further, an audio I/O 924 can be coupled to the second bus 920. Note that other architectures are possible. For example, instead of the point-to-point architecture of FIG. 9, a system can implement a multi-drop bus or other such architecture.

In one embodiment, at least one processor includes gated and ungated logic in accordance with any embodiment described herein. In one embodiment, the gated logic is powered down during a low power state of the processor.

Figure 10:
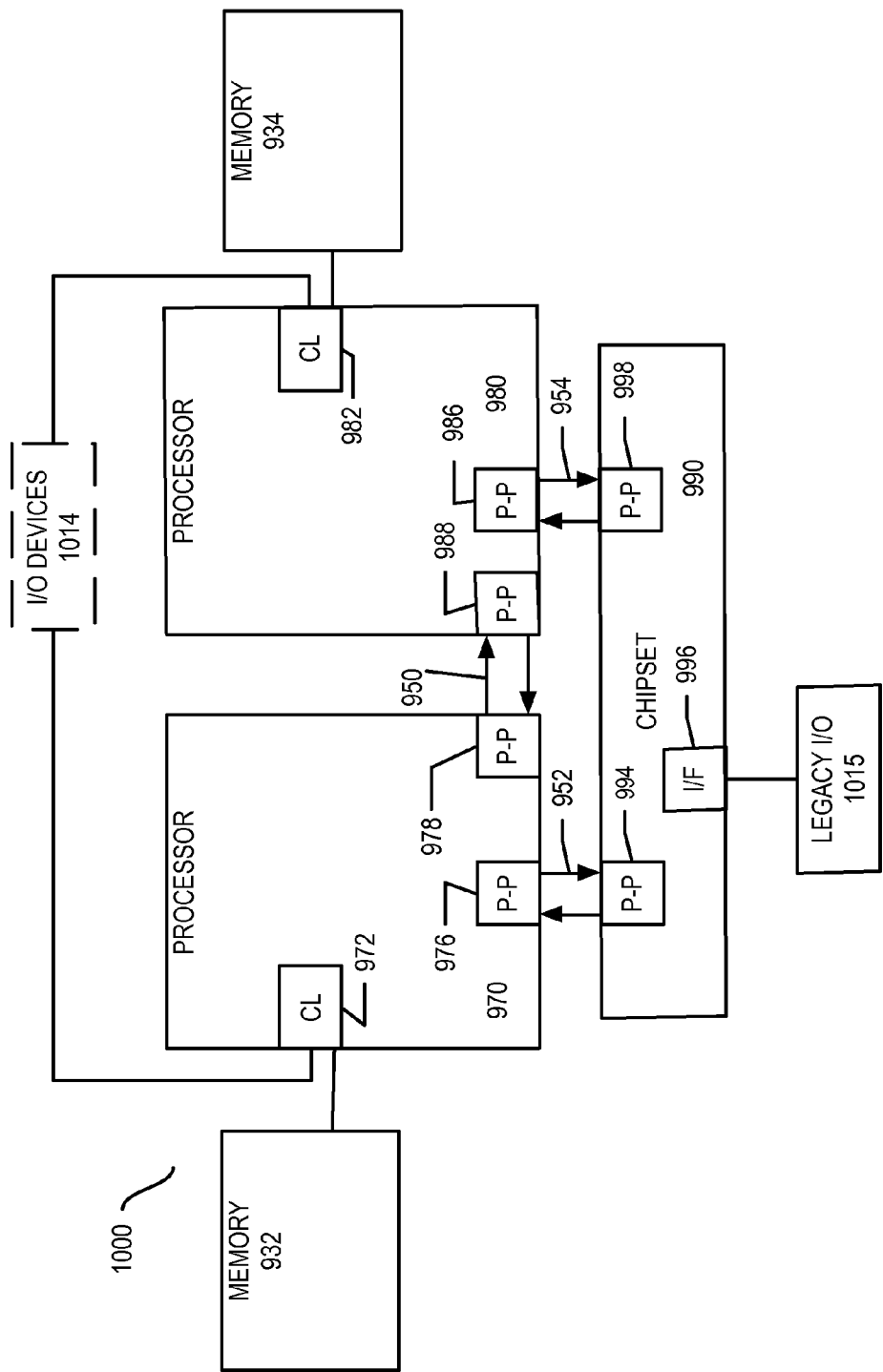

FIG. 10 is a block diagram of a second more specific exemplary system 1000. Like elements in FIGS. 9 and 10 bear like reference numerals and certain aspects of FIG. 9 have been omitted from FIG. 10 in order to avoid obscuring other aspects of FIG. 10.

FIG. 10 illustrates that the processors 970, 980 can include integrated memory and I/O control logic ("CL") 972 and 982, respectively. Thus, the CL 972, 982 includes both integrated memory controller units and I/O control logic. FIG. 10 illustrates that not only are the memories 932, 934 coupled to the CL 972, 982, but also that I/O devices 1014 are also coupled to the control logic 972, 982. Legacy I/O devices 1015 are coupled to the chipset 990.

Figure 11:
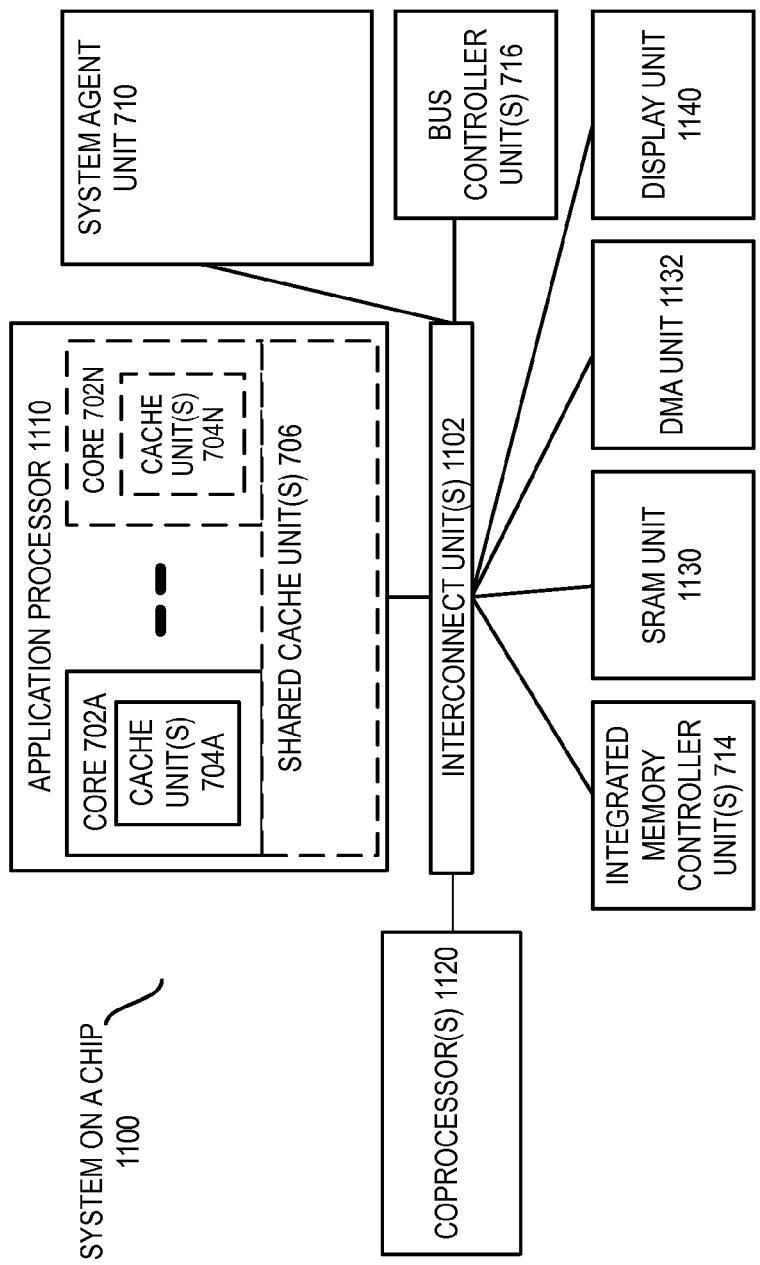

FIG. 11 is a block diagram of a SoC 1100 in accordance with an embodiment. Similar elements in FIG. 7 bear like reference numerals. Also, dashed lined boxes are optional features on more advanced SoCs. In FIG. 11, an interconnect unit(s) 1102 is coupled to: an application processor 1110 which includes a set of one or more cores 202A-N and shared cache unit(s) 706; a system agent unit 710; a bus controller unit(s) 716; an integrated memory controller unit(s) 714; a set or one or more coprocessors 1120 which include integrated graphics logic, an image processor, an audio processor, and a video processor; an static random access memory (SRAM) unit 1130; a direct memory access (DMA) unit 1132; and a display unit 1140 for coupling to one or more external displays. In one embodiment, the coprocessor(s) 1120 include a special-purpose processor, such as, for example, a network or communication processor, compression engine, GPGPU, a high-throughput MIC processor, embedded processor, or the like.

The mechanisms disclosed herein can be implemented in hardware, software, firmware, or a combination of such implementation approaches, including computer programs or program code executing on programmable systems comprising at least one processor, a storage system (including volatile and non-volatile memory or storage elements), at least one input device, and at least one output device.

Program code, such as code 930 illustrated in FIG. 9, can be applied to input instructions to perform the functions described herein and generate output information. The output information can be applied to one or more output devices, in known fashion. For purposes of this application, a processing system includes any system that has a processor, such as a digital signal processor (DSP), a microcontroller, an application specific integrated circuit (ASIC), or a microprocessor.

The mechanisms described herein are not limited to any particular programming language. The language can be a compiled or interpreted language. The program code can be implemented in a high level procedural or object oriented programming language to communicate with a processing system. The program code can also be implemented in assembly or machine language, if desired.

Embodiments that are implemented via reusable design blocks, known as IP cores, or IP design blocks include representative instructions stored on a machine-readable medium that represents various logic within the processor, which when read by a machine causes the machine to fabricate logic to perform the techniques described herein. Such representations can be stored on a tangible, machine-readable medium and supplied to various customers or manufacturing facilities to load into the fabrication machines that actually make the logic or processor.

Such machine-readable storage media include non-transitory articles manufactured or formed by a machine or device, including storage media such as hard disks, any other type of disk including floppy disks, optical disks, compact disk read-only memories (CD-ROMs), rewritable compact disks (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions. Accordingly, embodiments also include non-transitory, tangible machine-readable media containing instructions or containing design data, such as Hardware Description Language (HDL), which defines structures, circuits, apparatuses, processors or system features described herein. Such embodiments are also referred to as program products.

In some cases, an instruction converter is used to convert an instruction from a source instruction set to a target instruction set. For example, the instruction converter can translate (e.g., using static binary translation, dynamic binary translation including dynamic compilation), morph, emulate, or otherwise convert an instruction to one or more other instructions to be processed by the core. The instruction converter can be implemented in software, hardware, firmware, or a combination thereof. The instruction converter can be on processor, off processor, or part on and part off processor.

Figure 12:
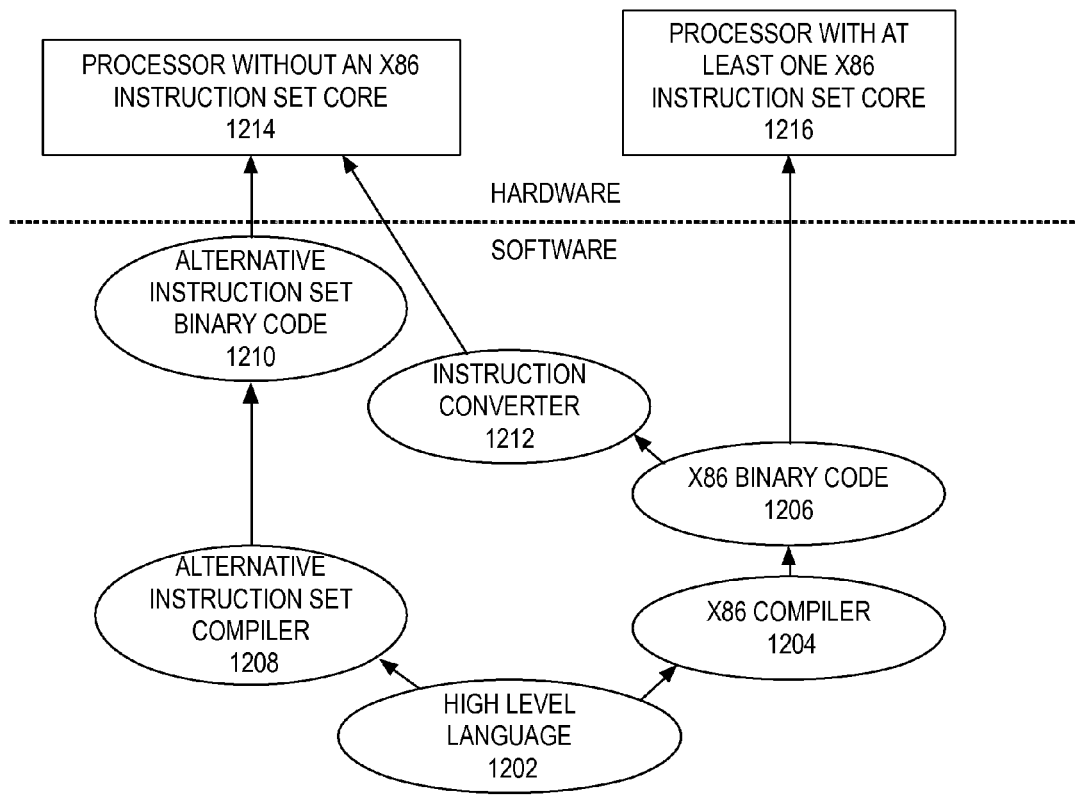
FIG. 12 is a block diagram of one embodiment contrasting the use of a software instruction converter to convert binary instructions in a source instruction set to binary instructions in a target instruction set.

FIG. 12 is a block diagram contrasting the use of a software instruction converter to convert binary instructions in a source instruction set to binary instructions in a target instruction set according to embodiments. In the illustrated embodiment, the instruction converter is a software instruction converter, although alternatively the instruction converter can be implemented in software, firmware, hardware, or various combinations thereof. FIG. 12 shows a program in a high level language 1202 compiled using an x86 compiler 1204 to generate x86 binary code 1206 that is natively executable by a processor with at least one x86 instruction set core 1216.

The processor with at least one x86 instruction set core 1216 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1204 represents a compiler that is operable to generate x86 binary code 1206 (e.g., object code) that can, with or without additional linkage processing, be executed on the processor with at least one x86 instruction set core 1216. Similarly, FIG. 12 shows that the program in the high level language 1202 can be compiled using an alternative instruction set compiler 1208 to generate alternative instruction set binary code 1210 natively executable by a processor without at least one x86 instruction set core 1214 (e.g., a processor with cores that execute the MIPS instruction set or the ARM instruction set).

The instruction converter 1212 is used to convert the x86 binary code 1206 into code that can be natively executed by the processor without an x86 instruction set core 1214. This converted code is not likely to be the same as the alternative instruction set binary code 1210 because an instruction converter capable of this is difficult to make; however, the converted code will accomplish the general operation and be made up of instructions from the alternative instruction set. Thus, the instruction converter 1212 represents software, firmware, hardware, or a combination thereof that, through emulation, simulation, or any other process, allows a processor or other electronic device that does not have an x86 instruction set processor or core to execute the x86 binary code 1206.

As described above, a processor comprises a plurality of processor cores, a plurality of design blocks coupled to the plurality of processor cores, each design block including a set of registers coupled to gated power, the set of registers to store active context of the design block, and logic circuitry coupled to the plurality of cores and the plurality of design blocks, to monitor access to the set of registers of each design block to detect a change in the active context, and to store an indication of one or more of the design blocks that includes the change in the active context. The processor further comprises memory coupled to the logic circuitry, the plurality of design blocks, and ungated power, where the memory is to store the active context while the processor is in a reduced power state.

In one embodiment, the processor logic circuitry further comprises a power manager to reduce voltage to the gated power when the processor is in the reduced power state. The voltage to the ungated power is not substantially reduced when the processor is the reduced power state. In one embodiment the processor logic circuitry further comprises logic to save the active context of a design block to the memory according to the stored indication that the design block includes the change in context. In one embodiment, the processor logic circuitry further comprises logic to store an indication identifying a subset of registers in the set of registers that have changed from a reset value. In one embodiment, the processor logic circuitry further comprises logic to restore the gated power to an operational level, and restore the active context of a design block according to the stored indication of the subset of registers in the set of registers that have changed from the reset value.

To the extent various operations or functions are described herein, they can be described or defined as software code, instructions, configuration, or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations without departing from their scope. Therefore, the illustrations and examples herein should be construed in an illustrative, and not a restrictive sense. The scope of the embodiments should be measured solely by reference to the claims that follow.

What is claimed is:

1. A processor comprising:
    a plurality of processor cores;
    a plurality of design blocks coupled to the plurality of processor cores, each design block including a set of registers coupled to gated power, the set of registers to store active context of the design block;
    logic circuitry coupled to the plurality of cores and the plurality of design blocks, to monitor access to the set of registers of each design block to detect a change in the active context, and to store an indication of one or more of the design blocks that includes the change in the active context, wherein the logic circuitry comprises:
        a power manager to reduce voltage to the gated power when the processor is in the reduced power state, and wherein the voltage to the ungated power is not substantially reduced when the processor is the reduced power state,
        logic to save the active context of a design block to the memory according to the stored indication that the design block includes the change in context, and
        logic to store an indication identifying a subset of registers in the set of registers that have changed from a reset value; and
    memory coupled to the logic circuitry, the plurality of design blocks, and ungated power, the memory to store the active context while the processor is in a reduced power state.

2. The processor as in claim 1, wherein the logic circuitry further comprises logic to restore the gated power to an operational level, and restore the active context of a design block according to the stored indication of the subset of registers in the set of registers that have changed from the reset value.

3. A system comprising:
    a processor including a design blocks and a system agent, the system agent to monitor access to the design block by a core of the processor to detect a change to a set of registers storing active context of the design block, wherein responsive to detecting the change in the set of registers, the system agent sets a first status bit indicating that the active context of the design block has been changed, and the system agent further sets a bit-field corresponding to a subset of the set of registers that have changed from a reset value of the block;
    a power manager to manage a power source coupled to the design block; and
    a display device coupled to an external display.

4. The system of claim 3, wherein the system agent comprises logic to save the set of registers of the design block to memory during a context save event when the first status bit is set and bypasses the set of registers of the design block when the first status bit is not set.

5. The system of claim 4, wherein the system agent further comprises logic to reset the first status bit after saving the set of registers and, during a context restore event, restore only the subset of registers that have changed from the reset value as indicated by the bit-field.

6. The system of claim 4, wherein the power manager comprises logic to reduce voltage to a first power source coupled to the set of registers after the context save event to reduce power consumption of the processor, wherein reducing the voltage to the first power source causes data in the set of registers to be lost.

7. The system of claim 6, wherein the power manager comprises additional logic to substantially maintain voltage to a second power source while the voltage is reduced to the first power source, wherein the second power source is coupled to the memory.

8. The system of claim 7, wherein the power manager comprises additional logic to restore the voltage to the power source coupled to the set of registers to an operational level.

9. A method comprising:
    monitoring access to a block of a processor to detect a change to a set of registers storing context of the block;
    responsive to detecting the change in the set of registers, setting a first status bit indicating that the context of the block has been changed, and setting a bit-field corresponding to a subset of the set of registers that have changed from a reset value of the block; and
    during a context save event, saving the set of registers of the block to memory when the first status bit is set and bypassing the set of registers of the block when the first status bit is not set, wherein the first status bit is reset after saving the set of registers.

10. The method of claim 9 further comprising reducing voltage to a power source coupled to the set of registers after the context save event to reduce power consumption of the processor, wherein reducing the voltage to the power source causes data in the set of registers to be lost.

11. The method of claim 10, further comprising substantially maintaining voltage to a second power source while the voltage is reduced to the power source coupled to the set of registers, wherein the second power source is coupled to the memory.

12. The method of claim 11 further comprising restoring voltage to the power source coupled to the set of registers to an operational level, and after restoring the voltage to the power source restoring only the subset of registers that have changed from the reset value as indicated by the bit-field.

13. The method of claim 10 wherein reducing voltage to the power source coupled to the set of registers after the context save event comprises reducing the voltage to a first power source coupled to a first set of registers while substantially maintaining the voltage to a second power source coupled to a second set of registers, where the first set of registers stores a first portion of the context, while the second set of registers stores a second portion of the context.

* * * * *